United States Patent [19]

Troisi

[11] Patent Number: 5,619,693

[45] Date of Patent: Apr. 8, 1997

[54] METHOD FOR SORTING AND STORING DATA EMPLOYING DYNAMIC SORT TREE RECONFIGURATION IN VOLATILE MEMORY

[75] Inventor: James H. Troisi, Sunnyvale, Calif.

[73] Assignee: Tandem Computers Incorporated, Cupertino, Calif.

[21] Appl. No.: 236,513

[22] Filed: May 2, 1994

[51] Int. Cl.$^6$ ........................................ G06F 17/30
[52] U.S. Cl. .................. 395/607; 364/DIG. 1; 364/222.9
[58] Field of Search ........................ 395/600, 607

[56] References Cited

U.S. PATENT DOCUMENTS

| | | | |
|---|---|---|---|
| 5,121,493 | 6/1992 | Ferguson | 395/600 |
| 5,146,571 | 9/1992 | Logan | 395/400 |
| 5,287,494 | 2/1994 | Garcia et al. | 395/600 |
| 5,307,486 | 4/1994 | Nakamigawa | 395/600 |
| 5,355,478 | 10/1994 | Brady et al. | 395/600 |

OTHER PUBLICATIONS

*The Art of Computer Programming*, vol. 3/Sorting and Searching, pp. 141–148 and pp. 251–258.

Menezes et al, "External Sorting on a Reconfigurable Message-passing Multicomputer: Experimental Results and Analysis", Proceedings of the 35th Midwest Symposium on Circuits and Systems, 9–12 Aug. 1992, IEEE, pp. 520–533.

*Primary Examiner*—Wayne Amsbury
*Attorney, Agent, or Firm*—Graham & James LLP

[57] ABSTRACT

In a computer system, data records stored in nonvolatile memory are read into a volatile memory and operated on in a sorting operation. A tournament-type sort is applied, with the tree size dynamically reconfigured within the volatile memory as a function of the number of data records to be sorted. The memory space occupied is reduced by the reconfigured tree and sort speed is augmented.

16 Claims, 14 Drawing Sheets

METHOD FOR SORTING AND STORING DATA EMPLOYING DYNAMIC SORT TREE RECONFIGURATION IN VOLATILE MEMORY

BACKGROUND OF THE INVENTION

1. Field of the Invention

The present invention relates to methods for sorting, storing and retrieving sorted data in computer systems. In particular, the present invention relates to sorting and storing data using sorting trees initialized in the volatile memory of a computer system.

2. Description of the Prior Art and Related Information

Handling large databases is a significant part of many applications of computer systems. For example, in a wide range of applications from financial services to retail operations and services, the handling of large databases in a efficient manner is a key requirement of the computer systems employed in these industries. Frequently, the databases of interest include a large number of separate data records, which data records need to be sorted in a desired order for efficient handling or searching. For example, such data records could include the pertinent information on employees in a corporation or account holders in a financial institution.

Such data records are typically stored in a high capacity nonvolatile storage medium such as disk drives associated with the computer system. As new data records are added, however, or upon initial creation of the database or database subset for storage, the sorting of the records into desired order is performed. This sorting is performed in the volatile working memory of the computer system which typically has a more limited capacity than the nonvolatile memory, which capacity may be needed for a variety of tasks other than the sorting of the data records.

Therefore, it is desirable to sort data records in the volatile memory of the computer system in as rapid and efficient manner as possible. It is further desired to minimize the amount of input/output (I/O) between the nonvolatile storage medium and the volatile memory due to the relatively slow nature of I/O operations relative to the operational speed of the computer system.

One highly efficient sorting technique which has been employed in the art is the so-called tournament sort. This approach is described, for example, in Knuth, Donald E., *The Art of Computer Programming, Volume 3-Sorting and Searching,* Section 5.4.1, pages 251–266, Addison-Wesley Publishing Company (1973). In this approach to sorting data records, a sort tree having a number of nodes configured in a hierarchical tree structure, is first created in the working memory of the computer system. Data records to be sorted are inserted into the bottom exterior nodes, or leaf nodes, of the sort tree, and the data records are compared up the tree in a tournament compare fashion until the "winners" emerge at the top of the tree in sorted order.

Prior to introducing the data records to be sorted into the sorting tree, however, the sorting tree first must be initialized. This initialization process involves introducing predetermined values into the tree structure which values will always win in any comparison with real data values. For example, such initialization values may take the form of negative infinity ($-\infty$) or positive infinity ($+\infty$), for ascending and descending sorts, respectively. These initialization values ensure that the real data records to be sorted move through the tree in the correct order. An initialization of the sort tree further requires that a "loser attribute" be determined for the interior nodes of the sorting tree. That is, since the initialization values loaded into the sorting tree all have the same nominal value, the initial losers and winners which move up the tree must be determined arbitrarily at the outset; that is, during initialization of the sort tree.

Although the tournament sort utilizing an initialized sort tree as described above theoretically has the desired characteristics of efficient and fast sorting, significant inefficiencies are encountered when the number of records to be sorted is not known in advance. For example, if it is desired that an unknown number of data records be sorted in a single sort, the largest sort tree which can be accommodated by the volatile memory of the computer system may be selected. Such a large sort tree will have considerable computer system time overhead associated with initializing the tree, however. Additionally, after initialization and before the first sorted data records are read out of the tree, all the initialization values must first be read out since such values are always "winners" relative to the real data records. Therefore, at least a corresponding number of comparison steps will be required to read out all the initialization values from the sort prior to getting actual sorted data records. Also, each subsequent data record sorted must be compared up the entire height of the tree, which height is log N, where N is the number of exterior nodes. If a relatively small set of data records is actually to be sorted, it will be appreciated that creation of a large sort tree involves a considerable amount of wasted computer time and uses an unnecessarily large part of the volatile memory.

If a relatively small sort tree is selected, equally small sets of data records to be sorted will be sorted in a close to optimal manner. However, sets of data records which exceed the sort tree size will encounter inefficiencies associated with performing the sort in two or more separate runs followed by merging sorts. More specifically, undesirable I/O overhead may be associated with reading and writing data records to and from main nonvolatile storage or scratch files during the separate runs through the sort tree. Also, initializing the small sort tree multiple times followed by one or more merge sorts will inevitably waste computer time as compared to a single sort.

Accordingly, it will be appreciated that the user of the computer system is faced with a "Catch-22" when undertaking a sort of an unknown number of data records. Choice of tree size which is either too large or too small will inevitably involve inefficiencies and wasted computer time which could otherwise be devoted to sorting. Such wasted time and inefficient use of working memory may be very significant where large databases are involved or where a large number of separate sorts are required.

Accordingly, it will be appreciated that a need exists for an improved method for sorting unknown quantities of database records. It will further be appreciated that such a method is needed which can optimize the use of available volatile memory and which can minimize the I/O overhead associated with transfers between nonvolatile and volatile memory.

SUMMARY OF THE INVENTION

The present invention provides a method for optimizing volatile memory usage and minimizing sort time in sorting unknown or variable numbers of database records.

In accordance with the present invention, data records to be sorted are read into volatile memory and data record identifiers including a sort key and a pointer to a specific volatile memory location, are created for each data record. A sort tree having interior and exterior nodes hierarchically arranged is then created in volatile memory and initialized in a predetermined ordered fashion. The nominal sort tree size may be selected by the user or be predetermined, e.g. as the maximum size sort tree compatible with the constraints of the available volatile memory space. Then, data record identifiers, including the key and pointer, are introduced into the tree in an order which moves across the exterior nodes of the tree rather than randomly populating the exterior nodes. The sort tree is dynamically altered, during or after introduction of the data record identifiers into the tree, to optimize the effective size of the sort tree. After the data record identifiers have all been input and the tree is dynamically reconfigured, the sort proceeds, with the keys being compared up the tree and the keys and pointers shifted in volatile memory into the sorted order. The sorted pointers are then used to read the data records from volatile memory back into volatile memory in sorted order.

Since the sort tree is dynamically reconfigured to an optimized effective size, selecting the maximum nominal size of the sort tree has the advantage of minimizing the number of times which the sort tree will need to be initialized as well as minimizing inefficiencies attendant to performing sorts on separate runs and merging the results of those runs. In addition, I/O overhead may be reduced by minimizing the number of times that data must be read and written from nonvolatile memory during the separate runs through separate sort trees.

In a preferred embodiment, the sort tree is dynamically reconfigured as it is created as data record identifiers are read in. That is, the sort tree is grown as necessary to accommodate data record identifiers introduced into the nascent tree. The sort tree employs a movable root node which is always set as low as possible in the sort tree. The root node is moved upwards as needed when data records are added. After the dynamically created and initialized sort tree is completed and all data record identifiers have been loaded, the data record key values are sorted using a compare rule in which a key value at a lower level in the sort tree hierarchy will leapfrog key values of equal value when they are compared.

In an alternative embodiment, a sort tree is completely initialized and data record identifiers are then read into the exterior nodes of the sort tree in the above-described ordered manner. Once all data values have been loaded, the sort tree is dynamically reduced to a more optimal size. One preferred reducing operation is to dynamically truncate, or "prune," the tree by eliminating unused exterior nodes and corresponding interior nodes. Data sorting may then proceed in the reduced tree using the above-noted compare rule. In an alternative embodiment all unused nodes are changed to a value corresponding to a predetermined loser value; i.e. a value which will lose all compares. Those nodes associated with dynamically changed loser values then become a dormant background of the sort tree since these values do not advance during compares. This effectively reduces the size of the sort tree. This approach may be combined with the pruning approach where sort consistency considerations prevent pruning all unused nodes from the tree. By reducing the size of the sort tree after initialization, the number of compares required to eliminate initialization values and to remove sorted data identifiers from the tree, is reduced. Therefore the present invention provides a method for sorting and storing database records using volatile and nonvolatile memory in which the size of the sort tree may be effectively reduced automatically.

Further features and advantages of the present invention will be appreciated from review of the following detailed description of the invention.

DETAILED DESCRIPTION OF THE INVENTION

Figure 1:
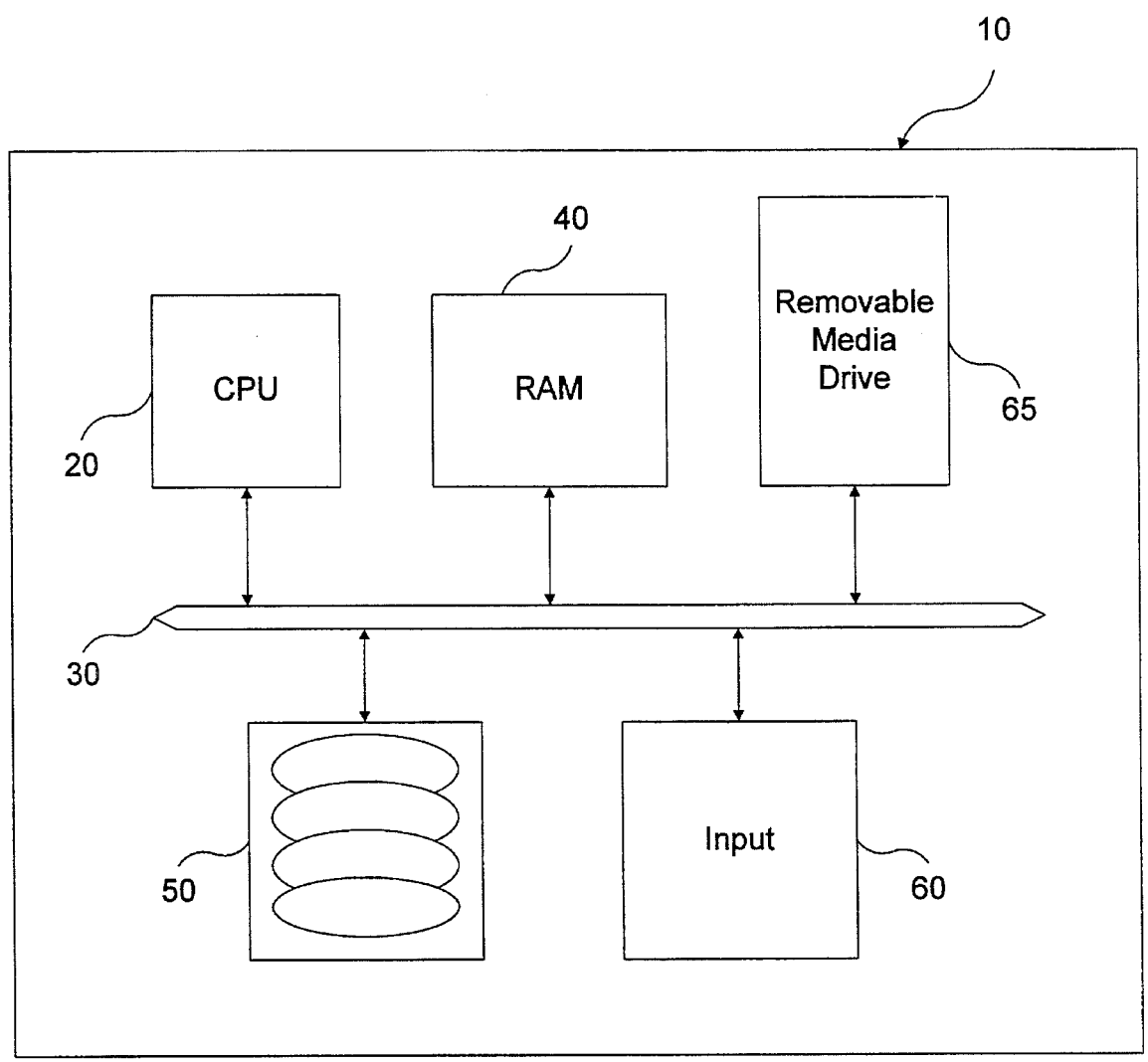
FIG. 1 is a system block diagram in accordance with the present invention.

In accordance with the present invention, data is sorted in a data processing system. As illustrated in FIG. 1, a data processing system 10 may be used. Typical data processing systems which may be used include mainframe computers, workstations or even personal computers. Also, multiple systems coupled in a network, with data records shared between systems on the network may be employed. Furthermore, the data processing system may include multiple subsystems operating in a fault tolerant manner or may include such subsystems operating in a parallel processing environment where portions of a given sort task are allocated to different processors. Also, such data processing system or systems may effectively employ the present invention when utilizing a variety of operating systems and programming languages.

As illustrated in FIG. 1, typical data processing system 10 includes a central processing unit 20 ("CPU"). The CPU is connected through a bus 30 to, inter alia, volatile memory 40 (also called RAM memory), non-volatile memory 50 (such as disk drives, CD-ROMs and magnetic tapes), an input means 60, such as a keyboard and a removable media drive 65 such as a floppy disk drive, CD-ROM drive, CD-WORM drive or tape drive.

It is desired to sort data contained in a database. The database may be stored either in the RAM memory 40 or the nonvolatile memory 50, but in the preferred embodiment, it is stored in the nonvolatile memory 50. This preference is based on practical necessity. Large databases of the type handled in many computer systems will require high capacity storage devices. These databases typically will be stored in high capacity nonvolatile storage systems. However, in some applications it also may be desired to store database records in a volatile memory.

Various types or categories of database records and information may be stored and sorted. For example, in a financial services application a database may store names, associated addresses and account numbers. In this example, each data record has associated data items. For example, credit card account number XX may have associated name NN and address AA. The records may be sorted based on any of these data items. The data item on which the sort is based is referred to herein as a sorting key. Thus, if it is desired to sort the records in ascending order based on one of the data types, such as credit card numbers, then the credit card number is referred to as the sort key. It also may be desired to keep track of the associated data items, such as the names and addresses associated with each credit card number.

To initiate a sort, data records are read from nonvolatile memory 50 into volatile memory 40. A segment within volatile memory 40 may preferably be allocated to the sort. A sort key is then selected (e.g. account number) and a data record identifier, including the key value and a pointer, is then created for each data record. The pointer contains a logical memory address in the volatile memory locating the associated data record.

Figure 2:
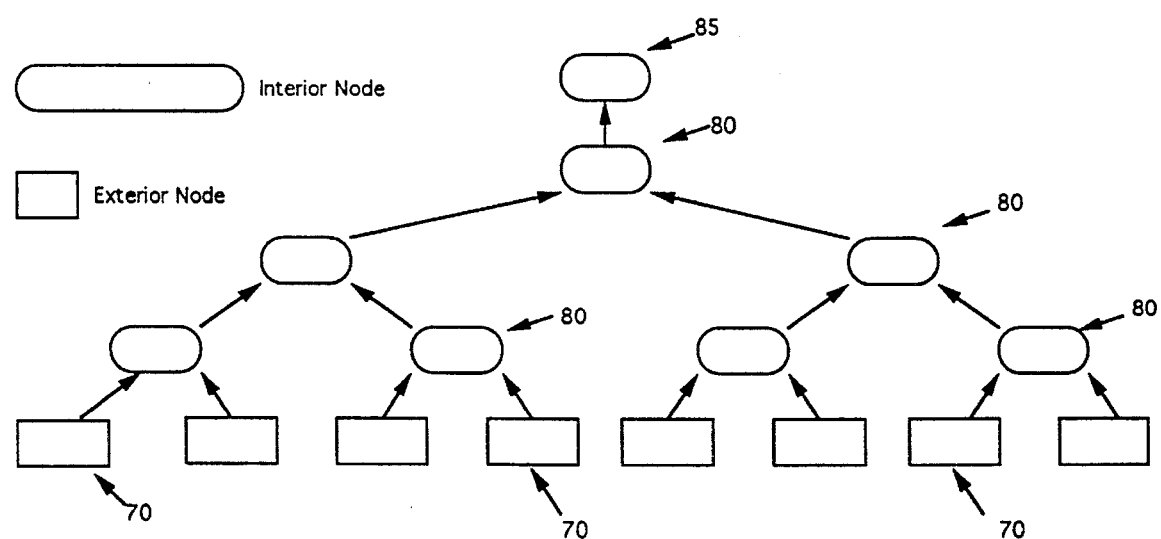
FIG. 2 is a diagram of an exemplary sort tree in accordance with the present invention.

A sort tree is also created in the allocated segment of volatile memory 40. The sort tree includes exterior nodes 70, interior nodes 80 and a root node 85, hierarchically arranged. An exemplary sort tree 90 is shown in FIG. 2. A location in memory 40 is allocated to each node as the tree is created.

Any size sort tree within the constraints of the allocated segment of volatile memory 40 may be selected. In a preferred embodiment, the maximum tree size is selected, such that as much as possible of the available space of the RAM memory 40 is occupied. This may be done without user input, automatically allocating all the available memory in the allocated segment for the sort tree. Alternatively, the user may select a sort tree size, based upon some estimate of the maximum likely number of data records to be sorted.

The sort tree is initialized by filling the tree with initialization values in a specific order. These initialization values are values set so that they always will win in a comparison with key values that are being sorted. For example, if an ascending sort of numbers is desired, a suitable initialization value will be negative infinity (−∞). The −∞ value will be less than any key value with which it is compared; thus, it will win in an ascending sort.

The sort tree preferably is filled in accordance with a sorting order set forth in the pseudo-source code annexed in the Appendices. Appendix 1.1 is pseudo-source code corresponding to the first embodiment discussed below. Appendix 1.1 is associated with the flow diagram in FIG. 12 which illustrates the steps in the pseudo-source code. Appendix 1.2 is pseudo-source code corresponding to the second embodiment discussed below. Appendix 1.2 is associated with the flow diagram in FIG. 13 which illustrates the steps in the pseudo-source code. Appendix 1.3 is pseudo-source code corresponding to the third embodiment discussed below. Appendix 1.3 is associated with the flow diagram in FIG. 14 which illustrates the steps in the pseudo-source code. Each of Appendices 1.1–1.3 refer to computer routines in Appendix 1.4.

Figure 11A:
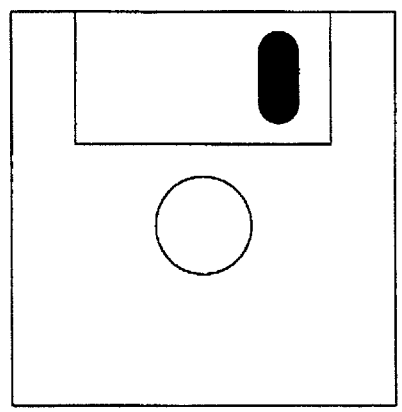
FIG. 11a is an illustration of a transportable floppy disk upon which implementing code is written in accordance with the present invention.
Figure 11B:
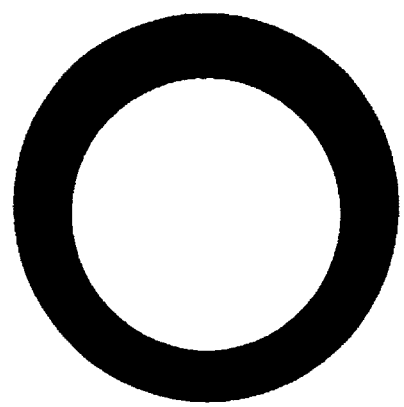
FIG. 11b is an illustration of a transportable computer tape upon which implementing code is written in accordance with the present invention.
Figure 11C:
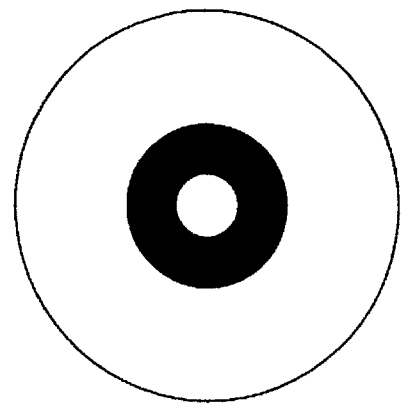
FIG. 11c is an illustration of a transportable optical disk upon which implementing code is written in accordance with the present invention.

The code in the Appendices are not specific to any particular computer language; it can be written in any computer language, such as C, C++, Assembler, Cobol or Fortran. The code, including compiled or binary versions, may be stored in volatile memory 50, or on a removable media received by removable media drive 65. Likewise, the code (as well as compiled or binary versions) preferably may be implemented on a transportable media, such as floppy disks, magnetic tape or optical disks, as illustrated in FIGS. 11a, 11b and 11c respectively. As is known to those skilled in the art, the code may be formed upon the transportable media as magnetic flux reversals, or in the case of optical disks, in the form of changes optical reflectivity of the medium.

Figure 3:
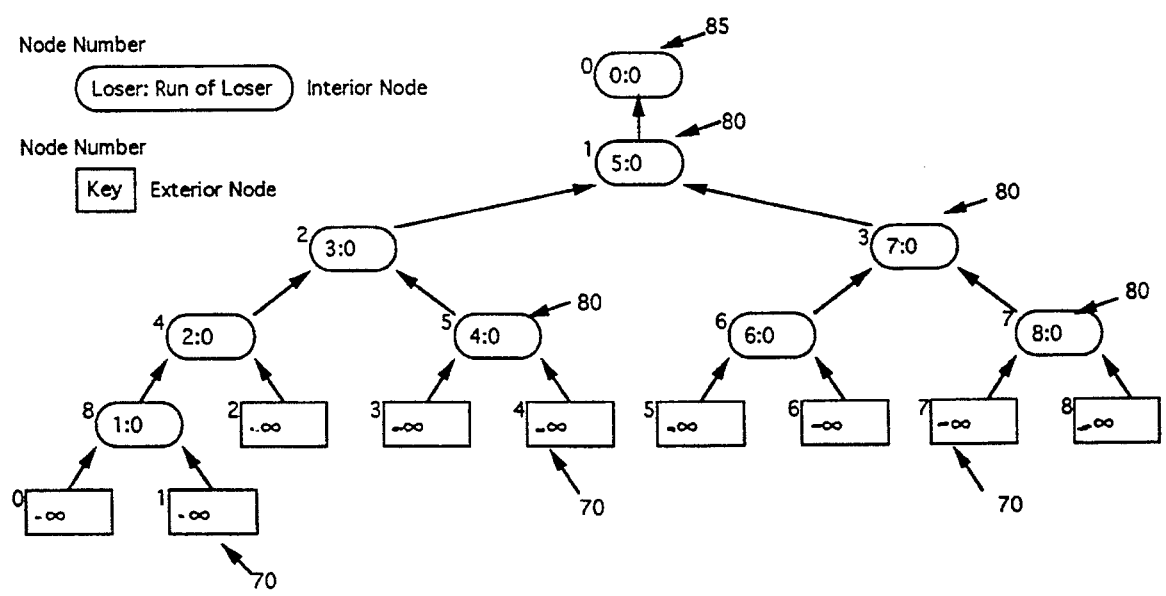
FIG. 3 is a diagram of an initialized nine exterior node sort tree in accordance with the present invention.

A nine exterior node tree is illustrated in FIG. 3. The exterior nodes 70 are each given a node number shown in FIG. 3 adjacent the upper left corners of each node. This numbering scheme is repeated in succeeding figures. The nine exterior node numbers are in ascending order, from left to right, starting with "0" and ending with the ninth node, numbered "8". Although the nodes are depicted as being numbered from left to right in the figures, any numbering scheme may be used, such as from right to left. An ordered loading of the exterior nodes is preferred. Specifically, the left most node should be loaded first, then the adjacent unpopulated node must be loaded after its immediate neighbor is loaded. This may be accomplished by loading from left to right in the depiction of FIG. 3 or in accordance with the techniques in the Appendices. Each exterior node 70 is populated with a winner value, namely −∞ in the illustrated example. Of course other values may be winners in different sorts. For example, in a descending sort, +∞ would be a winner value. In any event, in any sort, any RUN 0 value will be deemed a winner over any RUN 1 value.

The interior nodes 80 are each populated with Loser Attribute values and RUN values. In the figures, the Loser Attribute and RUN values are depicted separated by a colon (":"), although any depiction also may be used. For example, interior node 4 is populated with a Loser Attribute of 2 and a RUN number of 0. The Loser Attributes correspond to the exterior node with that number. Thus, the Loser Attribute of 2 corresponds to exterior node 2. The loser attributes of the interior nodes 80 are set so that input or data values are filled in left to right order in the example illustrated.

Data values are read into the exterior nodes of the tree. Data records stored in the non-volatile memory 50 are accessed using CPU 20 and data bus 30. Preferably the data records are transferred to the RAM memory 40 as needed and read into the exterior nodes of the tree. Preferably each data item has a data value or data identifier and an associated pointer which points to associated data stored in the database in the nonvolatile memory 50.

Compares between values are conducted as in the typical tournament-type scheme. Namely, the winners of a compare in lower nodes are compared with the current value of the nodes above. However, a different compare rule is applied. Specifically, the data values at a lower level in the sort tree hierarchy are ordered to leap past data values of equal value when they are compared. Likewise, the winning data values are ordered to leap past the losing values in compares. For example, in an ascending sort, a data value will leap past +∞ because it is numerically less and accordingly is a winner in an ascending sort.

Figure 4:
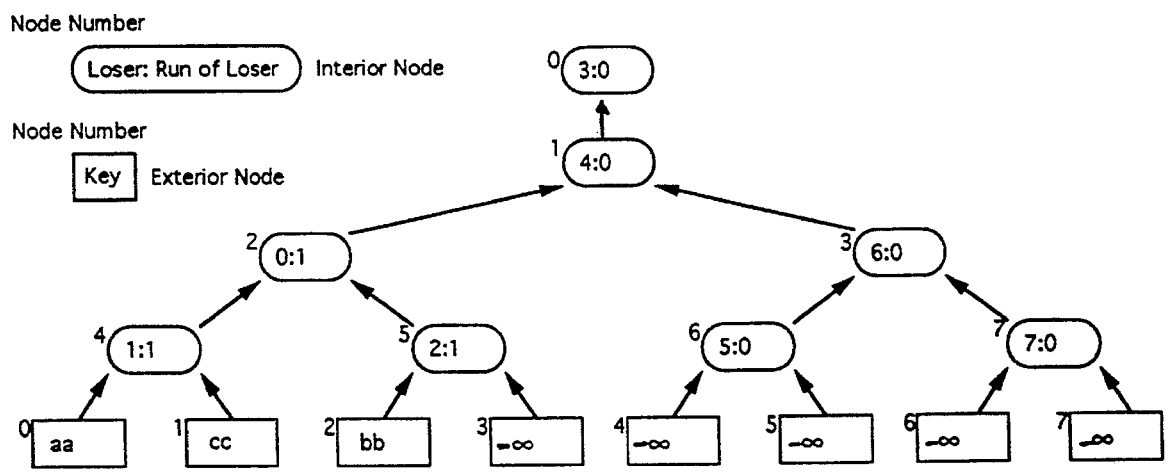
FIG. 4 is a diagram of an eight exterior node sort tree with three data record identifiers inserted in accordance with the present invention.
Figure 12:
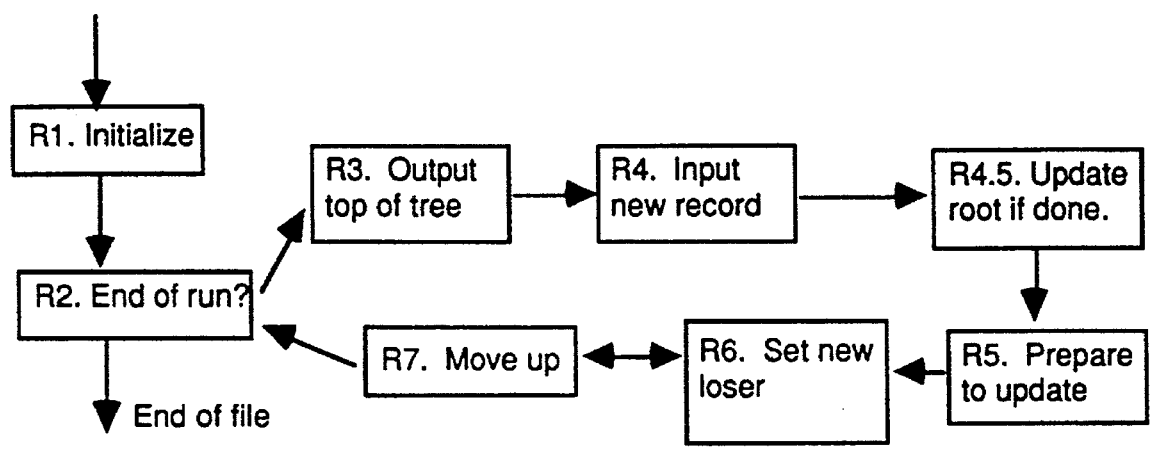
FIG. 12 is a flow diagram associated with Appendix 1.2 in accordance with the present invention.

In a first, preferred, embodiment for optimizing data processing performance of a sort tree, the data values are read into a sort tree which has been initialized as discussed above. FIG. 12 illustrates steps for loading the data. FIG. 4 illustrates a sort tree into which data values have been input. An eight exterior node tree is illustrated. The three input data values—"aa", "cc", and "bb"—are in exterior nodes 0, 1 and 2 respectively.

Once the total number of data items has been determined, such as by inputting all the data items into the sort tree, the tree is pruned in order to eliminate unused nodes. Typically, an end-of-file (EOF) is detected in the input data stream immediately after the last data item is reached. Once the end of the data stream is detected, the pruning process may commence. Specifically, the subtrees consisting solely of interior nodes containing RUN values of 0 (corresponding to RUN 0) are pruned. In the FIG. 4 illustration, interior nodes 1, 3, 6 and 7 are pointing to RUN 0 initialization values. To accomplish the pruning, the node highest in the tree pointing to an actual value (i.e. a RUN 1 value) is redefined to point to the root node of the tree. In FIG. 4, that highest node is interior node 2.

Figure 5:
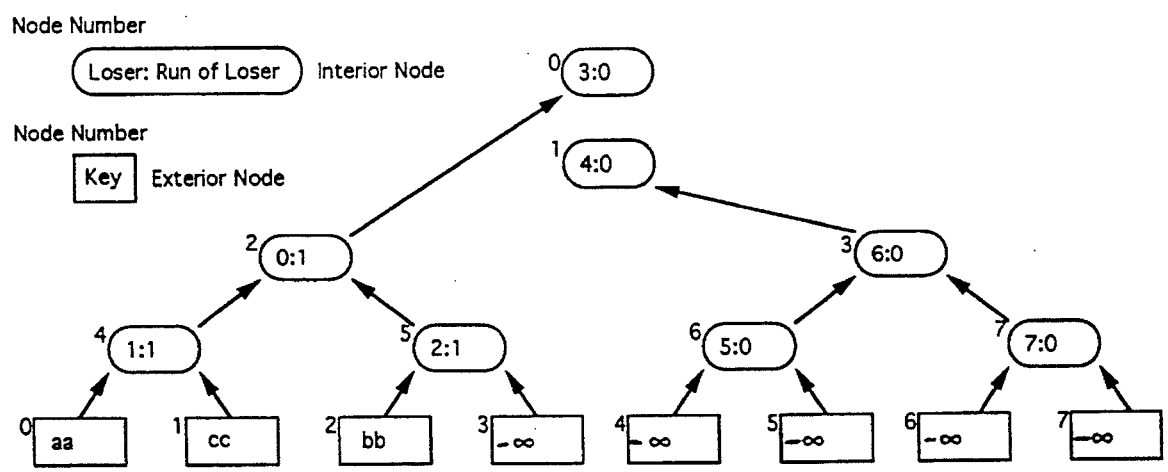
FIG. 5 is a diagram of a pruned sort tree resulting from the sort tree of FIG. 4 in accordance with the present invention.

The resulting pruned tree consists only of the root node and the interior nodes pointing to actual values (in FIG. 4, interior nodes 0, 2, 4 and 5) along with the corresponding exterior nodes (in FIG. 4, exterior nodes 0 through 3). The pruned tree resulting from the example illustrated in FIG. 4 is illustrated in FIG. 5. The top interior node in the hierarchy points to the root node, since it is the highest interior node pointing to an actual value. In FIG. 5, interior node 2 is the top interior node in the hierarchy. The sort then continues with the new tree structure.

Figure 13:
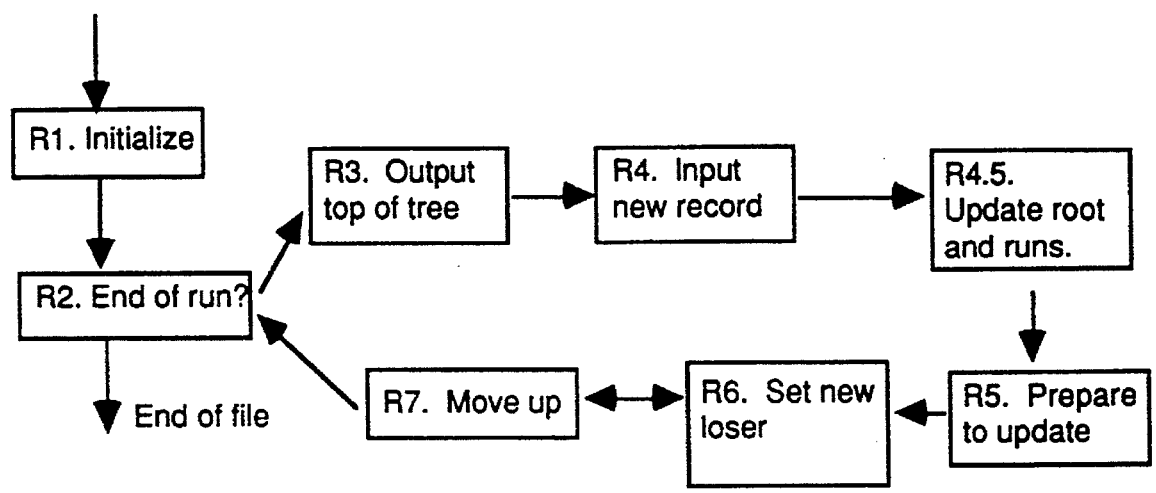
FIG. 13 is a flow diagram associated with Appendix 1.3 in accordance with the present invention.

In a second embodiment for optimizing the performance of a sort tree, which is adapted to be used in combination with the first embodiment, all the data values are read into a sort tree which has been initialized as discussed above. FIG. 13 illustrates steps for loading the data. The sort is run until an end of file (EOF) is detected. Then the RUN 0 initialization values (i.e. −∞ in the examples discussed above) are bypassed thereby achieving access to the data values faster. This is accomplished by replacing all RUN 0 initialization values with RUN 2 loser values. In one embodiment all of the nodes of the tree are examined to determine whether they correspond to RUN 0 initialization values; then RUN 2 values are substituted. The RUN 2 loser values are selected to be losers, namely, they will lose in any comparison with a data value that is read in. One possibility is to select the RUN 2 loser values to correspond to the value assigned to the first EOF detected. For example, in an ascending sort, +∞ will be a loser value, so +∞ is substituted for all RUN 2 values. In effect, the unused exterior nodes become dormant background of the sort tree. Because of the compare rule in this invention, they will be bypassed by any data values in any compare operation.

Figure 6:
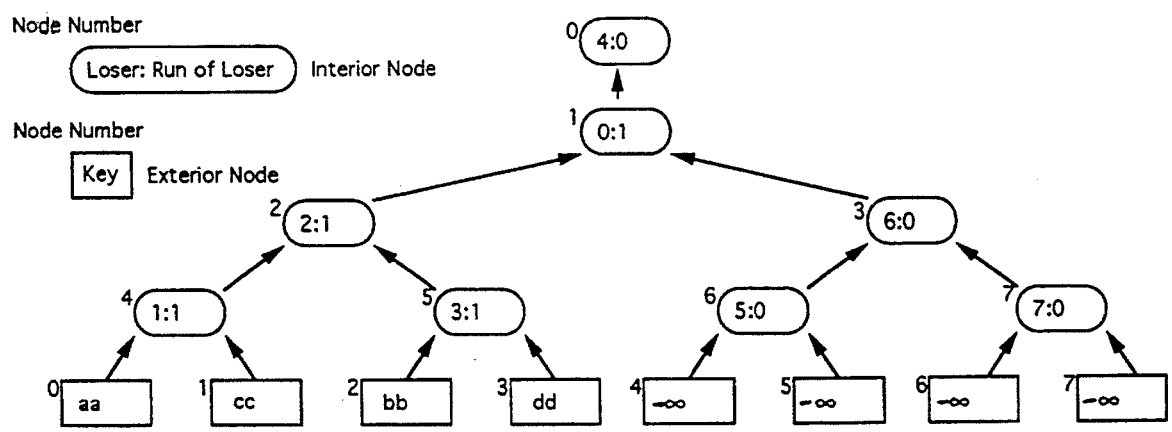
FIG. 6 is a diagram of an eight exterior node sort tree with four data record identifiers inserted in accordance with the present invention.
Figure 7:
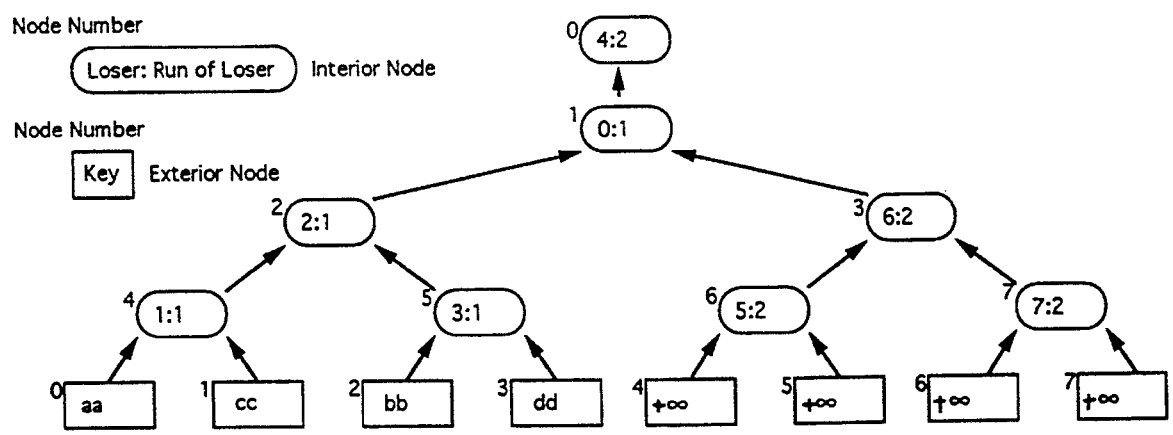
FIG. 7 is a diagram of an eight exterior node sort tree with four data record identifiers inserted and with RUN 2 values inserted in accordance with the present invention.

FIGS. 6 and 7 illustrate this embodiment. FIG. 6 illustrates an eight exterior node sort tree into which four data values have been input. The data values—"aa", "cc", "bb" and "dd"—are in external nodes 0, 1, 2 and 3 respectively. Once all data items have been input into the sort tree, an end-of-file (EOF) indicator typically will be detected and the EOF value (a loser) may be input into the next exterior node (i.e. node 4 in FIG. 6). The loser value in the ascending sort illustrated will be +∞. Once this first EOF value is detected, all RUN 0 initialization values are changed to RUN 2 loser values. Specifically, the sort tree set forth in FIG. 7 results from the sort tree in FIG. 6. In each of the available exterior nodes (numbers 4, 5, 6 and 7), loser values replace the RUN 0 initialization values. In the example shown in FIG. 7, the loser values are +∞. In addition, the interior nodes populated with RUN 0 initialization values are each changed to indicate RUN 2 loser values. In FIG. 7 this is shown in interior nodes 3, 6 and 7 as well as root node 0. For example, in interior node 6, the value is changed from "5:0" to "5:2". Then, when the tournament's main loop is executed, after the input stream has been exhausted, a compare of the new RUN 2 value stored in node 4 is made against the value "aa" in node 1. Node 1 wins because "aa" is compared with +∞. Under the comparison rule of the present invention, "aa" wins in an ascending sort and values are removed from the left side of the sort tree. This in effect disables the right side of the sort tree which is populated only by RUN 2 values. This results in an effectively pruned tree consisting of only the left side, which is populated by the RUN 1 data values.

Figure 8:
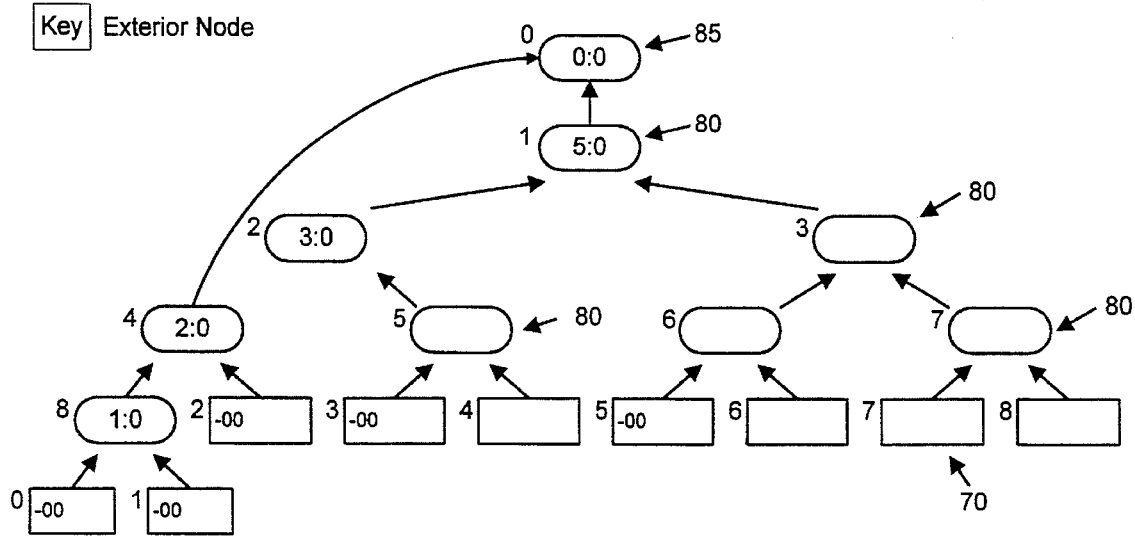
FIG. 8 is a diagram of an eight exterior node sort tree with the left branch initialized in accordance with the present invention.

In a third, preferred, embodiment, the sort tree is kept at a minimum size throughout a sort. Only those portions of the sort tree that are actually utilized for sorting the data are initialized along with the root node and the left most full branch of the tree; i.e. the branch from the root node to the left most exterior node of the tree. Thus, rather than starting out with a sort tree initialized with RUN 0 initialization values, the sort tree starts out only partially initialized. First, the left most full branch of the tree is initialized, then the lowest interior node on this branch is set to point at the root node. All other nodes are not initialized. As illustrated in FIG. 8, instead of initializing the entire sort tree, only interior nodes 0, 1, 2, 4 and 8 and the interior nodes they point at are initialized with winner values. The root node 85 is set above the lowest interior node in the branch, namely interior node 8.

Figure 14:
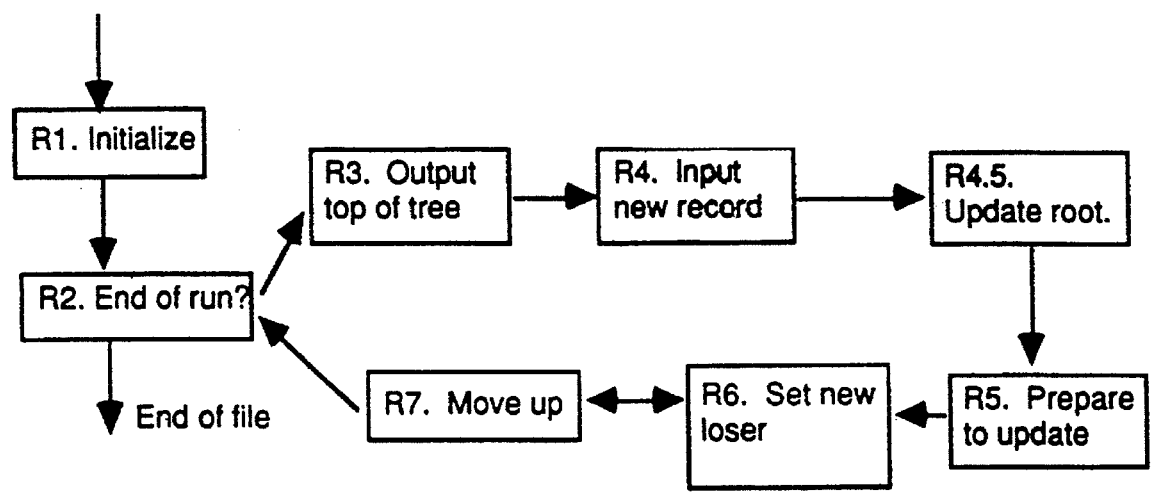
FIG. 14 is a flow diagram associated with Appendix 1.4 in accordance with the present invention.

Then data items may be input. As the initialized portions are filled, additional branches may be initialized as needed. Preferably, right before an actual value is inserted into an exterior node, the tree is restructured so a new node points at the root node, if the tree needs to be expanded to accommodate the new value. The tree is expanded if there is only one empty initialized exterior node left in the current tree. The exterior and interior nodes needed for the expanded tree defined by the new root node are initialized and the node above the current node pointing at the root node is set to point at the root node. FIG. 14 illustrates steps for loading data and setting (i.e. updating) which node will point to root node.

A preferred method to determine whether a new node needs to point at the root node is based on ascertaining the Loser Value of the node above the interior node pointing at the root node. That Loser Value corresponds to the number of the exterior node that will be used to receive a data item after the current sort tree is filled. For example, referring to FIG. 3, if the current sort tree descends from interior node 4, then the node above interior node 4 is interior node 2. The Loser Value of interior node 2 is "3". Thus, the number of the exterior node that will be used to receive a data item when the current sort tree is filled will be exterior node 3, which corresponds to the Loser Value of interior node 2.

Since exterior node 3 is outside the current sort tree (which descends from interior node 4), then an additional branch encompassing exterior node 3 will be initialized. Specifically, the highest interior node will move to interior node 2. All nodes ascending from exterior node 3 to interior node 2 will be initialized. Thus, interior node 5 and exterior node 3 will be initialized. This process is repeated until all data values are input.

A preferred method for initializing nodes is to use two indicators. The first indicator points to the interior node above the last exterior node that was filled and the second indicator points to the interior node above the next exterior node to be filled. If the level of the second indicator is at a higher level than the first indicator, the first indicator is moved up. If the node pointed to by the second indicator is the same as the first pointer then the initialization process stops. Assuming the initialization process continues, the interior node the second indicator points at is initialized and both indicators are then moved up to the next level in the hierarchy. If the two indicators then point to the same interior node, the initialization process stops. On the other hand, if the two indicators point to different interior nodes, the initialization and comparison process is repeated. At some point, the two indicators will point to the same node and the initialization process is completed.

Figure 9:
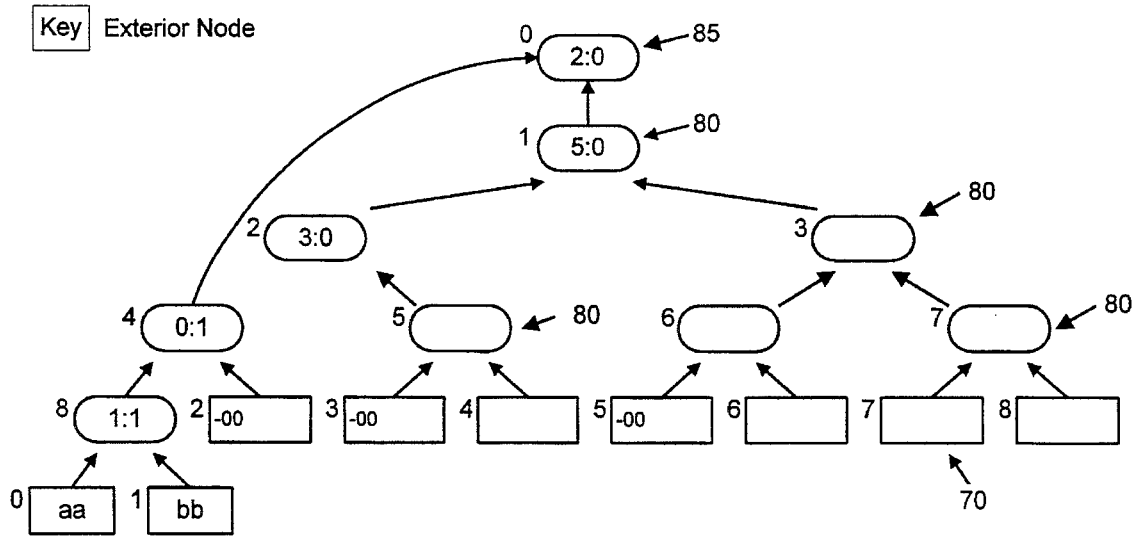
FIG. 9 is a diagram of a portion of a sort tree with the left branch initialized and two data record identifiers input in accordance with the present invention.

FIG. 9 illustrates the input of the second data item into the sort tree depicted in FIG. 8. The uninitialized nodes are shown as empty. Specifically, interior nodes 8, 4, 2, 1 and 0 are initialized along with corresponding exterior nodes 0, 1, 2, 3, and 5. The value of "aa" is input into exterior node 0, and bb into exterior node 1. To input a new value it is necessary to initialize another branch because adding a new value will cause a RUN 1 value to be moved above interior node 4. The root node is currently pointed at by the highest interior node pointing at a real number, i.e. node number 4. The next data item is read into exterior node 2. When exterior node 2 is filled, there will be no other space available in the initialized branch.

Figure 10:
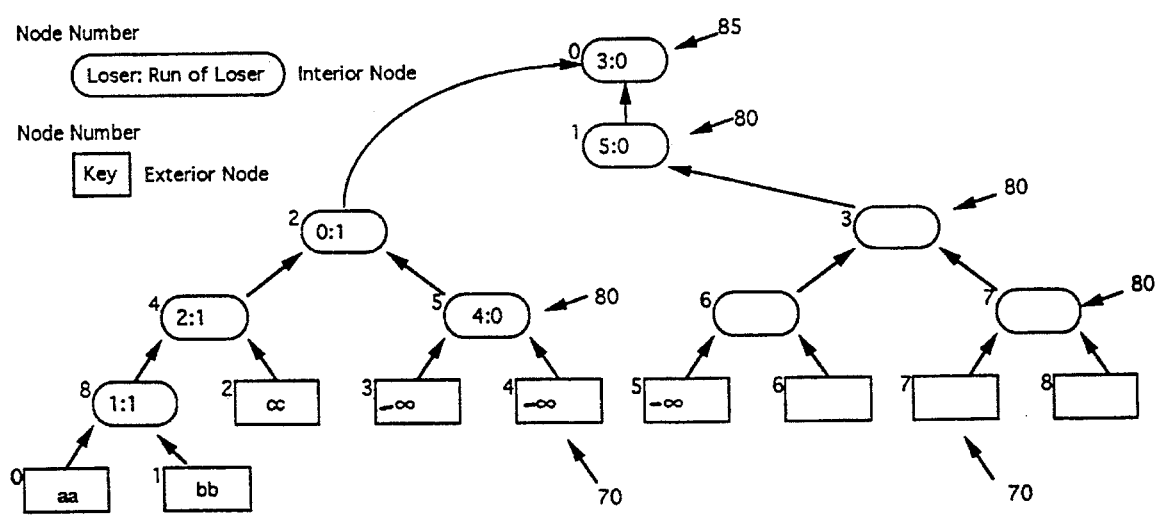
FIG. 10 is a diagram of a sort tree of in accordance with the present invention with interior nodes initialized and three data record identifiers input in accordance with the present invention.

When all the nodes in the initialized branch are occupied, the node that points to the root node is changed and initialization occurs. The node above the node pointing at the root node is set to point at the root node. In FIG. 9, the node that needs to change corresponds to interior node 2 and its corresponding exterior node, number 3. FIG. 10 illustrates this stage. In FIG. 10, the initialized nodes contain values and the uninitialized nodes are empty. Specifically, the branch descending from interior node 2 is initialized and this node now points at the root node. Also in FIG. 10, a third data value has been input. Exterior node 2 is populated with value "cc" and interior node 4 is initialized.

In this embodiment, only one compare is needed to remove the first RUN 0 initialization value. Specifically, the RUN 0 initialization value for exterior node 0 is extracted once the first RUN 1 value is input into exterior node 0. This is illustrated in FIGS. 8 and 9. In FIG. 8, the RUN 0 initialization value for exterior node 0 (0:0) is in the root node 85. In FIG. 9, that value is removed.

The embodiments of the present invention may also be combined. In various data sorts, combining the embodiments may achieve faster sorts. For example, the third embodiment may be used in conjunction with the second embodiment. Thus, when the last data item is read in and the sort tree has been built, all RUN 0 initialization values may be changed to RUN 2 loser values as described above.

The first embodiment may be further optimized when used in conjunction with the second embodiment. For example, when the last data item is read in and, as described in the first embodiment, the sort tree is reduced, there still may be remaining RUN 0 initialization values in the reduced sort tree. In accordance with the second embodiment, all remaining RUN 0 initialization values may be changed to RUN 2 loser values.

After the data sorts described above are completed, the sorted data may be read from the volatile memory 40 to the nonvolatile memory 50 is the order of the sorted data values. Alternatively, as each data value is retrieved from the root node, it may be read from the volatile memory 40 to the nonvolatile memory 50 in order.

Thus, it is seen that an apparatus and method for dynamically sorting database data is provided. One skilled in the art will appreciate that the present invention can be practiced by other than the preferred embodiments which are presented for purposes of illustration and not of limitation, and the present invention is only limited by the claims which follow.

---

Appendix 1.1

Variables

| | |
|---|---|
| COUNT | the number of input records seen so far; |
| EXTRAS | =the number of node on the lowest level of the tree; |
| FE | =pointer to the internal node above this external node in the tree; |
| FI | =pointer to the internal node above this internal node in the tree; |
| KEY | =the key stored in this external node; |
| LASTKEY | =the key of the last record output; |
| LOSER | =pointer to the "loser" store in this internal node; |
| P | =the size of the tree; |
| Q | =the current winner; |
| RC | =the number of the current run; |
| RECORD | =the record stored in this external node; |
| RN | =run number of the record pointed to by LOSER; |
| ROOT | =the node that points at the root of the tree; |
| RQ | =the run number of the current winner; |
| T | =pointer variable which will move up the tree. |
| log2(x) | =the log base 2 of x; |
| exp(x) | =2 raised to the xth power; |
| $\lfloor x \rfloor$ | =the largest integer less than or equal to x; |
| $\lceil x \rceil$ | =the smallest integer greater than or equal to x. |
| R1. | [Initialze.] Set COUNT ← 0, EXTRAS ← P - exp($\lfloor$log2(P)$\rfloor$), RMAX ← 0, RC ← 0, LASTKEY ← −∞, Q ← LOC(X[0]), ROOT ← 1, and RQ ←0. For 0 <= j < P, set the initial contents of X[j] as follows, when J = LOC(X[j]): |

-continued

|  |  |
|---|---|
|  | Loser(J) ← <Set_Loser algorithm from Appendix 1.4>;<br>RN(J) ← 0;<br>FE(J) ← <Father_Ext algorithm from Appendix 1.4>;<br>FI(J) ← LOC(X[⌊j/2⌋]). |
| R2. | [End of run?] If RQ = RC, go on to step R3. If RQ > RMAX, stop; otherwise set RC ← RQ. |
| R3. | [Output top of tree.] IF RQ ≠ 0, output RECORD(Q) and set LASTKEY ← KEY(Q) |
| R4. | [input new record] If the input file is exhausted, set RQ ← RMAX + 1 and go on to step R4.5. Otherwise set RECORD(Q) to the next record from the input file. Set COUNT ← COUNT + 1. If KEY(Q) < LASTKEY, set RQ ← RQ + 1 and then if RQ > RMAX set RMAX ← RQ. |
| R4.5. | [Update root.] If the input file is not exhausted or COUNT > (P−1) then go on to step 5. If COUNT = 0, stop; If COUNT = 1, output RECORD(Q) and stop. If COUNT < (2*EXTRAS), set ROOT ← exp(⌈log2(P)⌉-⌊log2(COUNT)⌋-1); otherwise set ROOT ← exp(⌊log2(P)⌋-⌊log2(COUNT-EXTRAS)⌋-1); Set FI(ROOT) ← 0; |
| R5. | [Prepare to update.] Set T ← FE(Q) |
| R6. | [Set new loser.] If RN(T) < RQ or if RN(T) = RQ and KEY(LOSER(T)) < KEY(Q), then interchange LOSER(T) ⟷ Q, RN(T) ⟷ RQ. |
| R7. | [Move up.] If T = LOC(X[ROOT]) then go back to R2, otherwise set T ← FI(T) and return to R6. |

---

Appendix 1.2

Variables

| | |
|---|---|
| COUNT | =the number of input records seen so far; |
| EXTRAS | =the number of node on the lowest level of the tree; |
| FE | =pointer to the internal node above this external node in the tree; |
| FI | =pointer to the internal node above this internal node in the tree; |
| KEY | =the key stored in this external node; |
| LASTKEY | =the key of the last record output; |
| LOSER | =pointer to the "loser" store in this internal node; |
| P | =the size of the tree; |
| Q | =the current winner; |
| RC | =the number of the current run; |
| RECORD | =the record stored in this external node; |
| RN | =run number of the record pointed to by LOSER; |
| ROOT | =the node that points at the root of the tree; |
| RQ | =the run number of the current winner; |
| T | =pointer variable which will move up the tree. |
| log2(x) | =the log base 2 of x; |
| exp(x) | =2 raised to the xth power; |
| ⌊x⌋ | =the largest integer less than or equal to x; |
| ⌈x⌉ | =the smallest integer greater than or equal to x. |
| R1. | [Initialze.] Set COUNT ← 0, EXTRAS ← P - exp(⌊log2(P)⌋), RMAX ← 0, RC ← 0, LASTKEY ← −∞, Q ← LOC(X[0]), ROOT ← 1, and RQ ←0. For 0 <= j < P, set the initial contents of X[j] as follows, when J = LOC(X[j]):<br>Loser(J) ← <Set_Loser algorithm from Appendix 1.4>;<br>RN(J) ← 0;<br>FE(J) ← <Father_Ext algorithm from Appendix 1.4>;<br>FI(J) ← LOC(X[⌊j/2⌋]). |
| R2. | [End of run?] If RQ = RC, go on to step R3. If RQ > RMAX, stop; otherwise set RC ← RQ. |
| R3. | [Output top of tree.] IF RQ ≠ 0, output RECORD(Q) and set LASTKEY ← KEY(Q) |
| R4. | [Input new record] If the input file is exhausted, set RQ ← RMAX + 1 and go on to step R4.5. Otherwise set RECORD(Q) to the next record from the input file. Set COUNT ← COUNT + 1. If KEY(Q) < LASTKEY, set RQ ← RQ + 1 and then if RQ > RMAX set RMAX ← RQ. |
| R4.5. | [Update root and runs.] If the input file is not exhausted or COUNT > (P−1) then go on to step 5. If COUNT = 0, stop; If COUNT = 1, output RECORD(Q) and stop. If COUNT < (2*EXTRAS), set ROOT ← exp(⌈log2(P)⌉-⌊log2(COUNT)⌋-1); otherwise set ROOT ← exp(⌊log2(P)⌋-⌊log2(COUNT-EXTRAS)⌋-1); For 0 <= j < P, IF RN(J) = 0, then set RN(J) = RQ. |
| R5. | [Prepare to update.] Set T ← FE(Q) |
| R6. | [Set new loser.] If RN(T) < RQ or if RN(T) = RQ and KEY(LOSER(T)) < KEY(Q), then interchange LOSER(T) ⟷ Q, RN(T) ⟷ RQ. |
| R7. | [Move up.] If T = LOC(X[ROOT]) then go back to R2, otherwise set T ← FI(T) and return to R6. |

Appendix 1.3

Variables

| | |
|---|---|
| COUNT | = the number of input records seen so far; |
| FE | = pointer to the internal node above this external node in the tree; |
| FI | = pointer to the internal node above this internal node in the tree; |
| INIT_1 | = pointer to the last initialized node; |
| INIT_2 | = pointer to the node to be initialized; |
| KEY | = the key stored in this external node; |
| LASTKEY | = the key of the last record output; |
| LOSER | = pointer to the "loser" store in this internal node; |
| P | = the size of the tree; |
| Q | = the current winner; |
| RC | = the number of the current run; |
| RECORD | = the record stored in this external node; |
| RN | = run number of the record pointed to by LOSER; |
| ROOT | = the node that points at the root of the tree; |
| RQ | = the run number of the current winner; |
| T | = pointer variable which will move up the tree; |
| TLOSER | = loser value of node above root.. |
| log2(x) | = the log base 2 of x; |
| exp(x) | = 2 raised to the xth power; |
| $\lfloor x \rfloor$ | = the largest integer less than or equal to x; |
| $\lceil x \rceil$ | = the smallest integer greater than or equal to x. |

R1. [Initialze.] Set COUNT ← 0, RMAX ← 0, RC ← 0, LASTKEY ← −∞, Q ← LOC(X[0]), ROOT ← the largest power of 2 less than P, and RQ ← 0. For = {0,and each power of 2 <= P}, set the initial contents of X[j] as follows, when J = LOC(X[j]):
    Loser(J) ← <Set_Loser algorithm from Appendix 1.4>;
    RN(J) ← 0;
    FE(J) ← <Father_Ext algorithm from Appendix 1.4>;
    FI(J) ← LOC(X[$\lfloor j/2 \rfloor$]).
If ROOT <> 1, set TLOSER ← LOSER(FI(ROOT));
otherwise set TLOSER ← -1. Set FI(ROOT) ← 0;

R2. [End of run?] If RQ = RC, go on to step R3. If RQ > RMAX, stop; otherwise set RC ← RQ.

R3. [Output top of tree.] IF RQ ≠ 0, output RECORD(Q) and set LASTKEY ← KEY(Q)

R4. [input new record] If the input file is exhausted, set RQ ← RMAX + 1 and go on to step R4.5. Otherwise set RECORD(Q) to the next record from the input file. Set COUNT ← COUNT + 1. If KEY(Q) < LASTKEY, set RQ ← RQ + 1 and then if RQ > RMAX set RMAX ← RQ.

R4.5. [Update root.] If the input file is exhausted or if COUNT ≠ TLOSER, go on to step 5. If TLOSER <> 1, set TLOSER ← LOSER(FI(TLOSER)); otherwise set TLOSER ← -1. Set FI(ROOT) ← LOC(X[$\lfloor ROOT/2 \rfloor$]). Set ROOT ← FI(ROOT) (Move the root to the node above the current root node). Set INIT_1 ← FE(COUNT-1). Set INIT_2 ← FE(COUNT). If the node pointed to by INIT_1 is lower in the tree than the node pointed to by INIT_2, set INIT_1 ← FI(INIT_1). LOOP: If
INIT_1 ≠ INIT_2, initialize the
node pointed to by INIT_2 and the interior node this exterior node points at using the algorithm in step R1; otherwise go to step 5. Repeat code labeled LOOP.

R5. [Prepare to update.] Set T ← FE(Q)

R6. [Set new loser.] If RN(T) < RQ or if RN(T) = RQ and KEY(LOSER(T)) <

KEY(Q), then interchange LOSER(T) ⟷ Q, RN(T) ⟷ RQ.

R7. [Move up.] If T = LOC(X[ROOT]) then go back to R2, otherwise set T ← FI(T) and return to R6.

Appendix 1.4

Variables

| | |
|---|---|
| node_num | = the node number to set the attribute of; |
| num_of_nodes | = number of nodes in the tree (P) |
| affected_node | = the node that would have a different node number if the tree was balanced. |
| height_max | = the maximum height for all externior nodes in the tree |
| heighthd —min | = the miniumum height for all externior nodes in the tree |
| result | = temporary result value |
| log(x) | = the log base 2 of x; |
| 2**x | = 2 raised to the xth power; |
| $\lfloor x \rfloor$ | = the largest integer less than or equal to x; |
| $\lceil x \rceil$ | = the smallest integer greater than or equal to x; |
| >> | = right shift of number |

```
INT(32)
PROC Set_Loser (node _num, num_of_nodes);
        INT(32) node_num;           {Node to find Loser attribute for}
        INT(32) num_of_nodes;       {Number of nodes in the tree}
{ This procedure returns the Loser attribute number for node node_num
in a tree with num_of_nodes nodes.)
BEGIN
INT(32)     affected_node;  {nodes after which the number of a
                             node differs in the balance vs. unbalanced case.}
INT         height_max;     {height of tree if tree was balanced by adding nodes}
INT         height_min;     {height of tree if tree was balanced by removing nodes}
INT         result;         {a temporary variable}
IF (node_num = 0) THEN RETURN (0);
affected_node := (2*num_of_nodes) - 2**⌈log(num_of_nodes⌉;
height_max := ⌈log(num_of_nodes)⌉ - ⌊log(node_num)⌋;
result := ((2**height_max)*node_num + 2**(height_max-1)
    -2**⌈log(num_of_nodes)⌉
IF (result <= affected_node) THEN RETURN (result)
ELSE BEGIN
    height_min := ⌊log(num_of_nodes)⌋ -⌊log(node_num)⌋;
    RETURN ((2**height_min)*node_num + 2**(height_min-1)
    -2**⌊log(num_of_nodes)⌋ + (affected_node/2));
END;
END;
INT(32)
PROC Father_Ext (node_num, num_of_nodes)
        INT(32) node_num;           {Node to find Father_Ext attribute for}
        INT(32) num_pt_nodes;       {Number of nodes in the tree}
{ This procedure returns the Father_Ext attribute number for node node_num
in a tree with num_of_nodes nodes.}
BEGIN
IF (node_num < ((2*num_of_nodes) - 2**⌈log
(num_of_nodes)⌉))
    THEN RETURN ((2**⌈log(num_of_nodes)⌉ + node_num) >>1)
    ELSE RETURN((2**⌈log(num_of_nodes)⌉ - num_of_nodes +
node_num) >>1);
END;
```

What is claimed is:

1. A method of sorting and storing data in a computer system, the computer system including a Central Processor Unit (CPU), nonvolatile memory accessible by the CPU, and volatile working memory associated with the CPU, the nonvolatile memory including a plurality of data records stored therein, comprising the steps of:

reading said data records from said nonvolatile memory and storing them in said volatile working memory;

assigning a unique data record identifier to each data record in said volatile memory, each said identifier including a memory pointer and a key value;

initializing a sort tree in said volatile memory, said sort tree including a plurality of nodes allocated to locations in said volatile memory, said nodes including a plurality of exterior nodes, a plurality of interior nodes, and a root node arranged in a hierarchical configuration, said initializing step including:

associating initialization values with said exterior nodes; and assigning a loser attribute to each of said interior nodes, said loser attribute associating an exterior node with said interior node and a remaining exterior node being associated with said root node;

serially introducing said data record identifiers into said exterior nodes of said initialized sort tree, the first of said data record identifiers being introduced into the exterior node associated with said root node and subsequent data record identifiers being associated with consecutive adjacent exterior nodes;

after the last of the data record identifiers has been introduced to said sort tree, redefining the sort tree so as to eliminate one or more of said exterior or interior nodes not containing a data record identifier;

sorting said data record identifiers by comparing said key values through said sort tree to said root node, extracting said data record identifiers from said root node and storing the data record identifiers, including the associated memory pointers, in an order in said volatile memory determined by the order they are extracted from the root node; and reading said data records from said volatile memory in accordance with the sorted memory pointers and storing them in said nonvolatile memory in the order of said sorted key values.

2. A method as set out in claim 1, wherein said data record identifiers are introduced into the exterior nodes of the tree from left to right across the tree.

3. A method as set out in claim 1, wherein said step of redefining the sort tree comprises the steps of:

determining the interior node lowest in the tree that is directly connected to all the nodes containing data record indicators;

redefining such lowest interior node to point to the root node; and truncating the sort tree by removing all nodes not directly connected to said redefined node.

4. A method as set out in claim 1, wherein said initialization values are $-\infty$ and wherein said sorting step sorts in ascending order.

5. A method as set out in claim 1, wherein said initialization values are $+\infty$ and wherein said sorting step sorts in descending order.

6. A method as set out in claim 1, wherein said initialized sort tree has a height of N nodes, where N is the number of exterior nodes, and wherein said step of redefining reduces the height of said tree to N-X nodes, where X is determined by the number of data record identifiers input into the tree.

7. A method as set out in claim 6, wherein said initialized sort tree height is predetermined.

8. A method as set out in claim 1, wherein said step of assigning a loser attribute comprises assigning exterior nodes of losers to interior nodes in an ascending order across the tree.

9. A method as set out in claim 1, wherein said initializing step comprises balancing the exterior nodes to form a symmetric tree.

10. A method of sorting and storing data in a computer system, the computer system including a Central Processor Unit (CPU), nonvolatile memory accessible by the CPU, and volatile working memory associated with the CPU, the nonvolatile memory including a plurality of data records stored therein, comprising the steps of:

reading said data records from said nonvolatile memory and storing them in said volatile working memory;

assigning a unique data record identifier to each data record in said volatile memory;

initializing a sort tree in said volatile memory, said sort tree including a plurality of nodes allocated to locations in said volatile memory, said nodes including a plurality of exterior nodes, a plurality of interior nodes, and a root node arranged in a hierarchical configuration, said initializing step including:

associating first predetermined values with said exterior nodes; and assigning a loser attribute to each of said interior nodes, said loser attribute associating an exterior node with said interior node and a remaining exterior node being associated with said root node;

serially introducing said data record identifiers into said exterior nodes of said initialized sort tree, the first of said data record identifiers being introduced into the exterior node associated with said root node and subsequent data record identifiers being associated with consecutive adjacent exterior nodes, wherein said first predetermined values are serially removed from said tree as said data record identifiers are introduced to said tree;

after the last of the data record identifiers has been introduced to said sorting tree, redefining the tree by eliminating a portion of the nodes not containing data record identifiers, removing all remaining first predetermined values and replacing them with second predetermined values;

sorting said data record identifiers by comparing said data record identifiers through said sort tree to said root node, extracting said data record identifiers from said root node and storing the data record identifiers in an order in said volatile memory determined by the order they are extracted from the root node; and reading said data records from said volatile memory and storing them in said nonvolatile memory in the order of said sorted record identifiers.

11. A method as set out in claim 10, wherein said data record identifiers include a sorting key indicating a characteristic of the record desired to be sorted and a pointer identifying a unique volatile memory location for each record and wherein said step of sorting comprises sorting based on comparing sorting key values.

12. A method as set out in claim 10, wherein said first predetermined values are $-\infty$, said second predetermined values are $+\infty$ and wherein said sorting step sorts in ascending order.

13. A method as set out in claim 10, wherein said first predetermined values are $+\infty$, said second predetermined values are $-\infty$ and wherein said sorting step sorts in descending order.

14. A method as set out in claim 10, wherein said first predetermined values are chosen so as to win a comparison with any of said data record identifiers.

15. A method as set out in claim 10, wherein said second predetermined values are chosen to lose a comparison with any of said data record identifiers.

16. A method as set out in claim 10, wherein said step of assigning a loser attribute comprises assigning exterior nodes of losers to interior nodes in an ascending order across the tree.

* * * * *